United States Patent [19]

Mihara

[11] 4,403,836
[45] Sep. 13, 1983

[54] CATA-DIOPTRIC TYPE TELEPHOTO LENS SYSTEM

[75] Inventor: Shin'ichi Mihara, Hachiouji, Japan

[73] Assignee: Olympus Optical Co., Ltd., Tokyo, Japan

[21] Appl. No.: 248,902

[22] Filed: Mar. 30, 1981

[30] Foreign Application Priority Data

Apr. 4, 1980 [JP] Japan .................................. 55/43599

[51] Int. Cl.³ .............................................. G02B 17/08
[52] U.S. Cl. .................................................... 350/444
[58] Field of Search ........................................ 350/444

[56] References Cited

U.S. PATENT DOCUMENTS 3,507,556 4/1970 Shimizu ............................... 350/444
3,632,190 1/1972 Shimizu ............................... 350/444
4,188,091 2/1980 Fujii ..................................... 350/444

FOREIGN PATENT DOCUMENTS 47-1909 1/1972 Japan .
53-131835 11/1978 Japan .
55-157711 12/1980 Japan ................................... 350/444

*Primary Examiner*—John K. Corbin
*Assistant Examiner*—Scott J. Sugarman
*Attorney, Agent, or Firm*—Cushman, Darby & Cushman

[57] ABSTRACT

A cata-dioptric type telephoto lens system comprising a first, second, third, fourth and fifth lenses, wherein the first lens is a positive meniscus lens arranged convex toward the object side, the second lens is a negative meniscus lens arranged convex toward the image side and having a reflecting surface formed on its convex surface by leaving a transparent central portion, the third lens is a biconvex lens cemented to the surface on the image side of the first lens, the fourth lens is a biconcave lens cemented to the surface on the object side of the first lens and having a reflecting surface formed on its surface on the object side, and the fifth lens is a negative meniscus lens cemented to the surface on the object side of the second lens, the cata-dioptric type telephoto lens system being extremely light in weight and compact and having aberrations corrected favorably.

6 Claims, 10 Drawing Figures $d_2 = d_5 + d_7 + d_8$ $d_4 = d_7 + d_8$

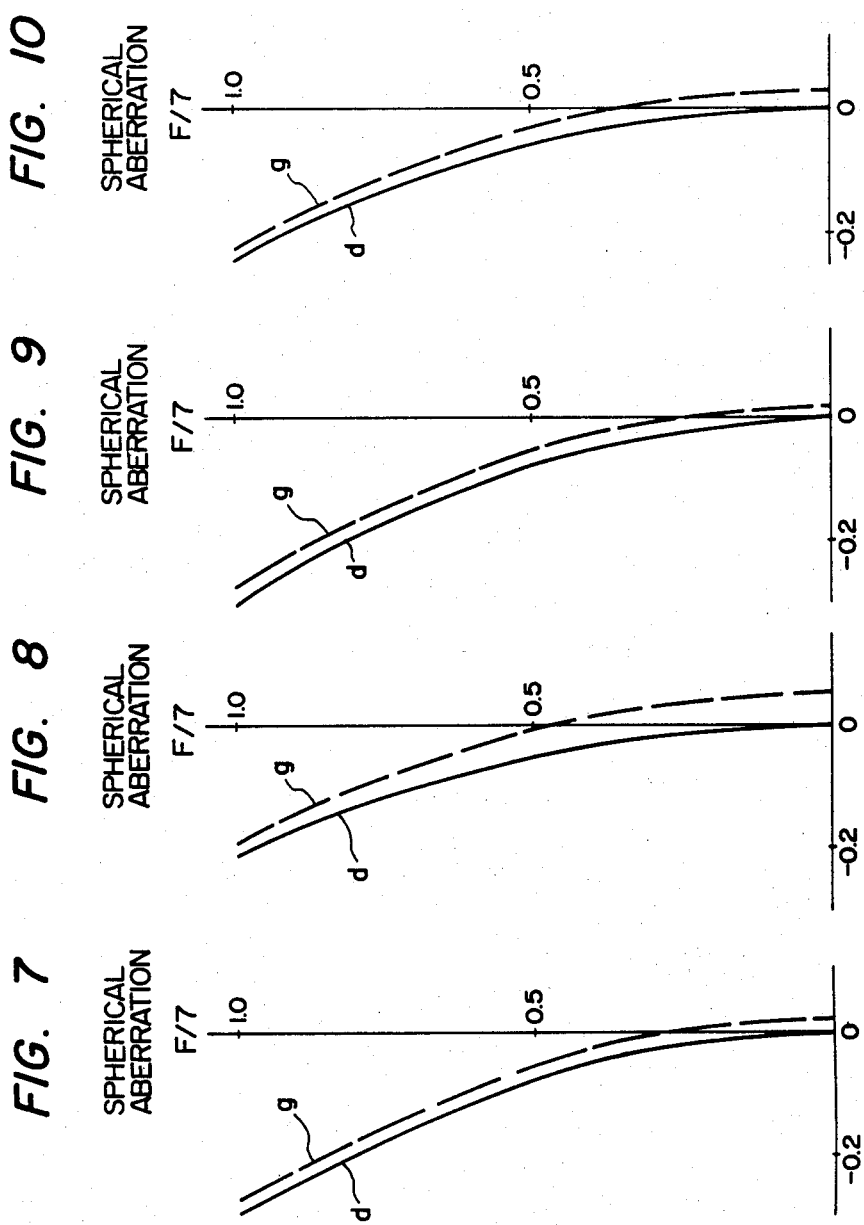

CATA-DIOPTRIC TYPE TELEPHOTO LENS SYSTEM

BACKGROUND OF THE INVENTION (a) Field of the Invention

The present invention relates to a cata-dioptric type telephoto lens system and, more particularly, to a cata-dioptric type telephoto lens system utilizing a cata-dioptric system which is to be used with a single-lens reflex camera.

(b) Description of the Prior Art

Compared with photographic telephoto lens systems in general, a cata-dioptric type telephoto lens system can be designed to be extremely compact and light in weight and, moreover, has large merit that chromatic aberration to be caused by the detrimental secondary spectrum is very small. Therefore, various kinds of cata-dioptric type telephoto lens systems have been invented.

A known example of such cata-dioptric type telephoto lens systems is disclosed in Japanese published examined patent application No. 1909/72. The above-mentioned known example seems to be a lens system with f=500 mm considering from the field angle of its embodiment. Compared with general photographic telephoto lens systems with f=500 mm, the above-mentioned lens system is considerably compact and shows favourable characteristic of cata-dioptric type telephoto lens systems. However, the above-mentioned lens system is not yet compact enough.

Another example of known cata-dioptric type telephoto lens systems is shown in Japanese published unexamined patent application No. 131835/78. This example is an extremely compact lens system with a very small telephoto ratio, i.e., 0.29.

For cata-dioptric type telephoto lens systems, the focusing method to advance the front lens is generally adopted in order to focus the lens system easily. In case of this focusing method, the value of spherical aberration fluctuates remarkably when the distance to the object to be photographed changes. Therefore, even when aberrations are favourably corrected in respect to an object at the infinite distance, aberrations especially spherical aberration and coma are aggravated when photographing an object at a short distance. In case of the above-mentioned lens system shown in Japanese published unexamined patent application No. 131835/78, aberrations are not yet corrected really favourably from the above-mentioned viewpoint and, therefore, this lens system is not fully satisfactory for practical use. In case of the above-mentioned lens system according to Japanese published unexamined patent application No. 131836/78, it is tried to eliminate detrimental rays by arranging a lens $L_5$ with a very large thickness between a lens $L_1$ located on the object side and primary mirror $L_2$ as shown in FIG. 1 and by adopting such method to apply black paint to the circumferential surface A of the thick lens $L_5$. As, however, the lens $L_5$ with a very large thickness is used, the lens system as a whole cannot be made satisfactorily light in weight. Besides, as it is evident from FIG. 1, the ray which enters through the lens $L_1$ but which is not eliminated by the circumferential surface A of the thick lens $L_5$ and enters the thick lens $L_5$ through its surface R on the object side (for example, the ray 1 in FIG. 1) is refracted by the surface R and is directed to the direction shown by reference symbol 1'. If the surface R exists at a position nearer the image side, for example, at the position R', the ray 1 is refracted by the surface R' and is directed to the direction shown by reference symbol 1" because the surface R is a diverging surface. That is, the ray 1" goes to a position out of the image surface. In other words, when the surface R is nearer the image side (when the lens $L_5$ is thinner), the ray 1 goes to a position out of the image surface and does not cause a ghost. Therefore, it is preferable to make the lens $L_5$ thinner also from this point of view.

SUMMARY OF THE INVENTION

It is, therefore, a primary object of the present invention to provide a cata-dioptric type telephoto lens system which is extremely light in weight and compact and for which aberrations are corrected favourably regardless of the distance to the object.

The cata-dioptric type telephoto lens system according to the present invention has lens configuration as shown in FIG. 2 and comprises a first, second, third, fourth and fifth lenses in the order according to the advancing direction of rays, the first lens $L_1$ being a positive meniscus lens arranged convex toward the object side, the second lens $L_2$ being a negative meniscus lens arranged convex toward the image side and having a reflecting surface formed on its convex surface by leaving a transparent central portion, the third lens $L_3$ being a biconvex lens having a diameter smaller than that of the first lens $L_1$ and cemented to the surface on the image side of the first lens $L_1$, the fourth lens $L_4$ being a biconcave lens having a diameter smaller than that of the first lens $L_1$, cemented to the surface on the object side of the first lens $L_1$ and having a reflecting surface formed on the surface of the object side thereof, the fifth lens $L_5$ being a negative meniscus lens cemented to the surface on the object side of the second lens $L_2$, having a diameter smaller than that of the second lens $L_2$ and arranged concave toward the object side. In this lens system, the rays from the object enter the lens system through the first lens $L_1$, are reflected by the surface on the image side of the second lens $L_2$, pass through the third lens $L_3$ and first lens $L_1$ in this order, are reflected again by the surface on the object side of the fourth lens $L_4$, pass through the first lens $L_1$ and third lens $L_3$, further pass through the fifth lens $L_5$, go out through the second lens $L_2$ and form an image. Besides the above-mentioned lens configuration, the lens system according to the present invention is arranged to satisfy the following conditions:

$$0.45f < r_1 < 0.75f \tag{1}$$

$$0.29f < f_{12} < 0.33f \tag{2}$$

$$0.03f < d_8 + d_3 < 0.05f \tag{3}$$

$$n_3 > 1.73 \tag{4}$$

$$n_4 < 1.58 \tag{5}$$

wherein reference symbol $r_1$ represents the radius of curvature of the surface on the object side of the first lens $L_1$, reference symbol $d_3$ represents the thickness of the second lens $L_2$, reference symbol $d_8$ represents the thickness of the fifth lens $L_5$, reference symbols $n_3$ and $n_4$ respectively represent refractive indices of the third lens $L_3$ and fourth lens $L_4$, reference symbol f represents the focal length of the lens system as a whole, and reference symbol $f_{12}$ represents the total focal length of the first lens $L_1$ and second lens $L_2$, i.e., the focal length of a system for which the surface on the object side of the first lens $L_1$ serves as the entrance surface and the surface on the object side of the second lens $L_2$ serves as the exit surface, the system being arranged so that the rays from the object enter the system through the surface on the object side of the first lens $L_1$, pass through the first lens $L_1$, enter the second lens $L_2$ through its surface on the object side, are reflected by the surface on the image side of the second lens $L_2$, and, then, go out of the system through the surface on the object side of the second lens $L_2$.

Now, the meanings of the above-mentioned respective conditions are described below.

The conditions (1) and (2) are established for the purpose of correcting spherical aberration which otherwise aggravates when photographing an object at a short distance by a lens system adopting the focusing method to advance the front lens. To correct the above-mentioned spherical aberration, it is necessary to limit power distribution and radii of curvature of lens surfaces in the front lens group of the lens system to some extent. This limit is given by the conditions (1) and (2). Out of them, the condition (1) defines the radius of curvature of the surface on the object side of the first lens $L_1$. When $r_1$ becomes smaller than the lower limit of the condition (1), spherical aberration and coma to be caused when the lens system is focused on the object at the infinite distance become considerably favourable and it is possible to favourably correct Petzval's sum to be caused when the lens system is focused on an object at the infinite distance. However, spherical aberration and coma to be caused when the lens system is focused on an object at a short distance aggravate considerably. When $r_1$ becomes larger than the upper limit of the condition (1), aggravation of spherical aberration and coma to be caused when the lens system is focused on an object at a short distance becomes considerably small. However, it becomes impossible to favourably correct aberrations to be caused when the lens system is focused on an object at the infinite distance and, especially, Petzval's sum becomes a large positive value. If it is attempted to correct the above-mentioned Petzval's sum, coma aggravates and this is not desirable.

The condition (2) defines the power of the converging system formed by the first lens $L_1$ and second lens $L_2$. When $f_{12}$ becomes smaller than the lower limit of the condition (2), it becomes easier to make the lens system compact. However, the power of the diverging system formed by the fourth lens $L_4$, fifth lens $L_5$, and second lens $L_2$ increases. Consequently, aggravation of spherical aberration, which is caused by the converging system when the lens system is focused on an object at a short distance, is remarkably increased by the diverging system and, therefore, it is not preferable for correction of aberrations in respect to an object at a short distance. When $f_{12}$ becomes larger than the upper limit of the condition (1), it becomes difficult to compactly arrange the lens system as a whole.

In case of the lens system according to the present invention, the fifth lens system $L_5$ is made thin in order to make the lens system light in weight and to eliminate the detrimental rays as described before. The condition (3) is established in order to attain the above-mentioned purpose. If $(d_8+d_3)$ becomes larger than the upper limit of the condition (3), thicknesses of the fifth lens $L_5$ and second lens $L_2$ become large. As a result, a ghost tends to appear, and the lens system as a whole becomes heavy. If $(d_8+d_3)$ becomes smaller than the lower limit of the condition (3), pin-cushion type distortion tends to be caused.

To favourably correct aberrations which occur when photographing an object at a short distance, it is necessary to favourably correct Petzval's sum, which becomes a large positive value. As one of correcting methods for attaining the above-mentioned purpose, it is effective when the refractive index of the glass material used for the third lens $L_3$ is made high and refractive index of the glass material used for the fourth lens $L_4$ is made low. This is defined by the conditions (4) and (5). If either of these conditions is not satisfied, Petzval's sum becomes unfavourable and it is not desirable for correction of aberrations to be caused when photographing an object at a short distance which are closely related to Petzval's sum.

The cata-dioptric type telephoto lens system described in the above enables to attain the object of the present invention. When, however, the lens system is arranged to further satisfy the following conditions, it is possible to obtain a still more favourable lens system.

$$0.13f < d_2 < 0.15f \tag{6}$$

$$n_2 < 1.6 \tag{7}$$

$$n_5 < 1.67 \tag{8}$$

$$v_5 < 50 \tag{9}$$

$$0.3f < f_3 < 0.4f \tag{10}$$

$$0.18f < |f_4| < 0.25f \tag{11}$$

$$0.18f < f_{25} < 0.24f \tag{12}$$

In the above-mentioned conditions, reference symbol $d_2$ represents the distance between the first lens $L_1$ and second lens $L_2$ ($d_2 = d_5 + d_7 + d_8$), reference symbols $n_2$ and $n_5$ respectively represent refractive indices of the second lens $L_2$ and fifth lens $L_5$, reference symbol $v_5$ represents Abbe's number of the fifth lens $L_5$, reference symbol $f_3$ represents the focal length of the third lens $L_3$, reference symbol $f_4$ represents the total focal length of the system into which the rays enter through the surface on the image side of the third lens $L_3$, pass through the third lens $L_3$ and first lens $L_1$, enter the fourth lens $L_4$, are reflected by the surface on the object side of the fourth lens $L_4$, pass through the first lens $L_1$ and third lens $L_3$ again and go out of the system through the surface on the image side of the third lens $L_3$, and reference symbol $f_{25}$ represents the total focal length of the second lens $L_2$ and fifth lens $L_5$.

The meanings of the above-mentioned conditions (6) through (12) are described below.

The condition (6) defines the distance $d_2$ between the first lens $L_1$ and second lens $L_2$. If $d_2$ becomes smaller than the lower limit of the condition (6), it becomes difficult to favourably correct spherical aberration and coma to be caused when photographing an object at the infinite distance and when photographing an object at a short distance. If $d_2$ becomes larger than the upper limit, the overall length of the lens system becomes long and this is not desirable for attaining the object of the present invention. Moreover, the intensity of marginal rays becomes low.

The conditions (7) and (8) respectively define the refractive indices of glass materials of the second lens $L_5$ and fifth lens $L_5$. If either $n_2$ or $n_5$ becomes larger than the upper limit of the corresponding condition, Petzval's sum tends to become a large positive value and, moreover, pin-cushion type distortion tends to occur.

The condition (9) defines Abbe's number of glass material of the fifth lens $L_5$ and this condition is necessary for correction of offaxial chromatic aberration. If $\nu_5$ becomes larger than the upper limit of the condition (9), offaxial chromatic aberration will be undercorrected.

The conditions (10) through (12) further define power distribution for lenses.

The condition (10) relates to the focal length of the third lens $L_3$. If $f_3$ becomes smaller than the lower limit of the condition (10), Petzval's sum tends to become a large positive value. If $f_3$ becomes larger than the upper limit of the condition (10), distortion tends to occur.

The condition (11) relates to the diverging system which comprises the secondary mirror and respective lenses cemented thereto, i.e., the fourth lens $L_4$, the first lens $L_1$ and third lens $L_3$. If $f_4$ becomes smaller than the lower limit of the condition (11), it becomes impossible to favourably correct spherical aberration and coma to be caused when photographing an object at a short distance. If $f_4$ becomes larger than the upper limit of the condition (11), it becomes difficult to make the overall length of the lens system short.

The condition (12) relates to the diverging system comprising the fifth lens $L_5$ and second lens $L_2$. If $f_{25}$ becomes smaller than the lower limit of the condition (12), pin-cushion type distortion becomes large. If $f_{25}$ becomes larger than the upper limit of the condition (12), Petzval's sum tends to become a large positive value and this is not desirable.

BRIEF DESCRIPTION OF THE DRAWINGS

FIGS. 7 through 10 respectively show graphs illustrating spherical aberration to be caused when Embodiments 1 through 4 are respectively focused on an object at a short distance.

DETAILED DESCRIPTION OF THE PREFERRED EMBODIMENTS

Figure 1:
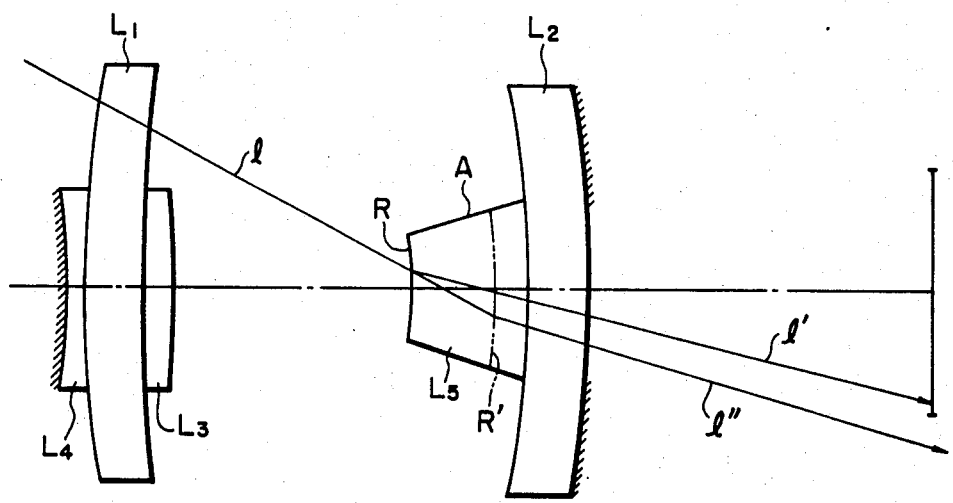
FIG. 1 shows a sectional view of an example of known cata-dioptric type telephoto lens systems.
Figure 2:
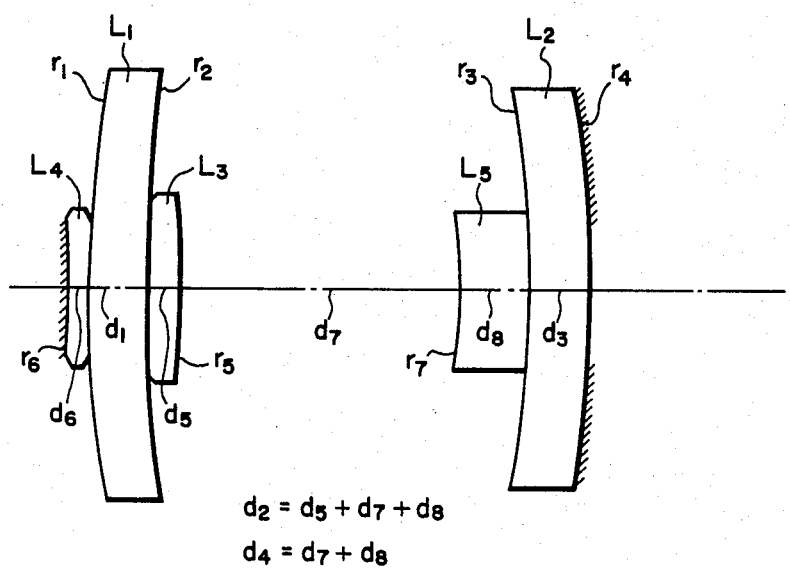
FIG. 2 shows a sectional view of the cata-dioptric type telephoto lens system according to the present invention.

Preferred embodiments of the cata-dioptric type telephoto lens system according to the present invention explained in the above are as shown below.

Embodiment 1

$\Sigma P = 0.360$
$r_1 = 49.733$
$d_1 = 2.062$    $n_1 = 1.58913$    $\nu_1 = 61.11$
$r_2 = 123.532$
$d_2 = 13.694$
$r_3 = -35.230$
$d_3 = 1.861$    $n_2 = 1.56732$    $\nu_2 = 42.83$
$r_4 = -52.023$
$d_3 = -1.861$    $n_2 = 1.56732$    $\nu_2 = 42.83$
$r_3 = -35.230$
$d_4 = -12.658$
$r_5 = -32.731$
$d_5 = -1.036$    $n_3 = 1.76200$    $\nu_3 = 40.20$
$r_2 = 123.532$
$d_1 = -2.062$    $n_1 = 1.58913$    $\nu_1 = 61.11$
$r_1 = 49.733$
$d_6 = -0.622$    $n_4 = 1.54771$    $\nu_4 = 62.83$
$r_6 = -28.196$
$d_6 = 0.622$    $n_4 = 1.54771$    $\nu_4 = 62.83$
$r_1 = 49.733$
$d_1 = 2.062$    $n_1 = 1.58913$    $\nu_1 = 61.11$
$r_2 = 123.532$
$d_5 = 1.036$    $n_3 = 1.76200$    $\nu_3 = 40.20$
$r_5 = -32.731$
$d_7 = 9.964$
$r_7 = -9.849$
$d_8 = 2.694$    $n_5 = 1.56444$    $\nu_5 = 43.78$
$r_3 = -35.230$
$d_3 = 1.861$    $n_2 = 1.56732$    $\nu_2 = 42.83$
$r_4 = -52.023$
$f = 100.0$  $2\omega = 5.15°$  $F_{NO} = 7.0$  $T = 0.29$
$f_1 = 139.9$, $f_{12} = 30.0$, $f_3 = 34.1$, $f_A = -20.1$, $f_4 = -32.8$
$f_{25} = -22.4$, $S = 0.8715$, $f_M = 70.05$

Embodiment 2

$\Sigma P = 0.400$
$r_1 = 68.382$
$d_1 = 2.062$    $n_1 = 1.58913$    $\nu_1 = 61.11$
$r_2 = 292.413$
$d_2 = 14.165$
$r_3 = -33.647$
$d_3 = 1.861$    $n_2 = 1.56732$    $\nu_2 = 42.83$
$r_4 = -52.051$
$d_3 = -1.861$    $n_2 = 1.56732$    $\nu_2 = 42.83$
$r_3 = -33.647$
$d_4 = -13.128$
$r_5 = -33.372$
$d_5 = -1.036$    $n_3 = 1.83400$    $\nu_3 = 37.19$
$r_2 = 292.413$
$d_1 = -2.062$    $n_1 = 1.58913$    $\nu_1 = 61.11$
$r_1 = 68.382$
$d_6 = -0.622$    $n_4 = 1.46450$    $\nu_4 = 65.94$
$r_6 = -28.161$
$d_6 = 0.622$    $n_4 = 1.46450$    $\nu_4 = 65.94$
$r_1 = 68.382$
$d_1 = 2.062$    $n_1 = 1.58913$    $\nu_1 = 61.11$
$r_2 = 292.413$
$d_5 = 1.036$    $n_3 = 1.83400$    $\nu_3 = 37.19$
$r_5 = -33.372$
$d_7 = 10.434$
$r_7 = -9.854$
$d_8 = 2.694$    $n_5 = 1.64769$    $\nu_5 = 33.80$
$r_3 = -33.647$
$d_3 = 1.861$    $n_2 = 1.56732$    $\nu_2 = 42.83$
$r_4 = -52.051$
$f = 100.0$, $2\omega = 5.15°$, $F_{NO} = 7.0$, $T = 0.297$
$f_1 = 151.0$, $f_{12} = 31.5$, $f_3 = 36.0$, $f_A = -24.9$, $f_4 = -42.9$
$f_{25} = -19.9$, $S = 0.9258$, $f_M = 69.90$

Embodiment 3

$\Sigma P = 0.190$
$r_1 = 49.830$
$d_1 = 2.062$    $n_1 = 1.58913$    $\nu_1 = 61.11$
$r_2 = 135.120$
$d_2 = 13.555$
$r_3 = -35.495$
$d_3 = 1.861$    $n_2 = 1.56732$    $\nu_2 = 42.83$
$r_4 = -52.286$
$d_3 = -1.861$    $n_2 = 1.56732$    $\nu_2 = 42.83$
$r_3 = -35.495$
$d_4 = -12.520$
$r_5 = -39.896$
$d_5 = -1.036$    $n_3 = 1.80610$    $\nu_3 = 40.95$ -continued

Embodiment 3

| | | |
|---|---|---|
| $r_2 = 135.120$ | | |
| $d_1 = -2.062$ | $n_1 = 1.58913$ | $\nu_1 = 61.11$ |
| $r_1 = 49.830$ | | |
| $d_6 = -0.622$ | $n_4 = 1.49831$ | $\nu_4 = 65.03$ |
| $r_6 = -28.370$ | | |
| $d_6 = -0.622$ | $n_4 = 1.49831$ | $\nu_4 = 65.03$ |
| $r_1 = 49.830$ | | |
| $d_1 = 2.062$ | $n_1 = 1.58913$ | $\nu_1 = 61.11$ |
| $r_2 = 135.120$ | | |
| $d_5 = 1.036$ | $n_3 = 1.80610$ | $\nu_3 = 40.95$ |
| $r_5 = -39.896$ | | |
| $d_7 = 9.825$ | | |
| $r_7 = -9.490$ | | |
| $d_8 = 2.694$ | $n_5 = 1.53172$ | $\nu_5 = 48.90$ |
| $r_3 = -35.495$ | | |
| $d_3 = 1.861$ | $n_2 = 1.56732$ | $\nu_2 = 42.83$ |
| $r_4 = -52.286$ | | |
| $f = 100.0$, $2\omega = 5.15°$, $F_{NO} = 7.0$, $T = 0.289$ | | |
| $f_1 = 132.8$, $f_{12} = 29.9$, $f_3 = 38.3$, $f_A = -19.7$, $f_4 = -36.2$ | | |
| $f_{25} = -22.5$, $S = 0.8539$, $f_M = 70.24$ | | |

Embodiment 4

| | | |
|---|---|---|
| $\Sigma P = 0.400$ | | |
| $r_1 = 60.090$ | | |
| $d_1 = 2.062$ | $n_1 = 1.58913$ | $\nu_1 = 61.11$ |
| $r_2 = 221.654$ | | |
| $d_2 = 13.816$ | | |
| $r_3 = -34.214$ | | |
| $d_3 = 1.861$ | $n_2 = 1.56732$ | $\nu_2 = 42.83$ |
| $r_4 = -52.256$ | | |
| $d_3 = -1.861$ | $n_2 = 1.56732$ | $\nu_2 = 42.83$ |
| $r_3 = -34.214$ | | |
| $d_4 = -12.780$ | | |
| $r_5 = -33.981$ | | |
| $d_5 = -1.036$ | $n_3 = 1.80440$ | $\nu_3 = 39.62$ |
| $r_2 = 221.654$ | | |
| $d_1 = -2.062$ | $n_1 = 1.58913$ | $\nu_1 = 61.11$ |
| $r_1 = 60.090$ | | |
| $d_6 = -0.622$ | $n_4 = 1.46450$ | $\nu_4 = 65.94$ |
| $r_6 = -27.957$ | | |
| $d_6 = 0.622$ | $n_4 = 1.46450$ | $\nu_4 = 65.94$ |
| $r_1 = 60.090$ | | |
| $d_1 = 2.062$ | $n_1 = 1.58913$ | $\nu_1 = 61.11$ |
| $r_2 = 221.654$ | | |
| $d_5 = 1.036$ | $n_3 = 1.80440$ | $\nu_3 = 39.62$ |
| $r_5 = -33.981$ | | |
| $d_7 = 10.086$ | | |
| $r_7 = -9.294$ | | |
| $d_8 = 2.694$ | $n_5 = 1.58144$ | $\nu_5 = 40.75$ |
| $r_3 = -34.214$ | | |
| $d_3 = 1.861$ | $n_2 = 1.56732$ | $\nu_2 = 42.83$ |
| $r_4 = -52.256$ | | |
| $f = 100.0$, $2\omega = 5.15°$ $F_{NO} = 7.0$ $T = 0.293$ | | |
| $f_1 = 139.0$, $f_{12} = 31.0$, $f_3 = 36.7$, $f_A = -23.3$, $f_4 = -41.0$ | | |
| $f_{25} = -20.3$, $S = 0.8978$, $f_M = 69.87$ | | |

In the above embodiments, reference symbols $r_1, r_2, \ldots$ respectively represent radii of curvature of respective lens surfaces given in the order according to the advancing direction of rays, reference symbols $d_1, d_2, \ldots$ respectively represent distances between respective lens surfaces given in the order according to the advancing direction of rays, reference symbols $n_1, n_2, \ldots$ respectively represent refractive indices of respective lenses, reference symbols $\nu_1, \nu_2, \ldots$ respectively represent Abbe's numbers of respective lenses, reference symbol $\Sigma P$ represents Petzval's sum, reference symbol T represents the telephoto ratio, reference symbol S represents the maximum advancing stroke of the front lens, and reference symbol $f_M$ represents the focal length of the lens system as a whole when the front lens is fully advanced.

Figure 3:
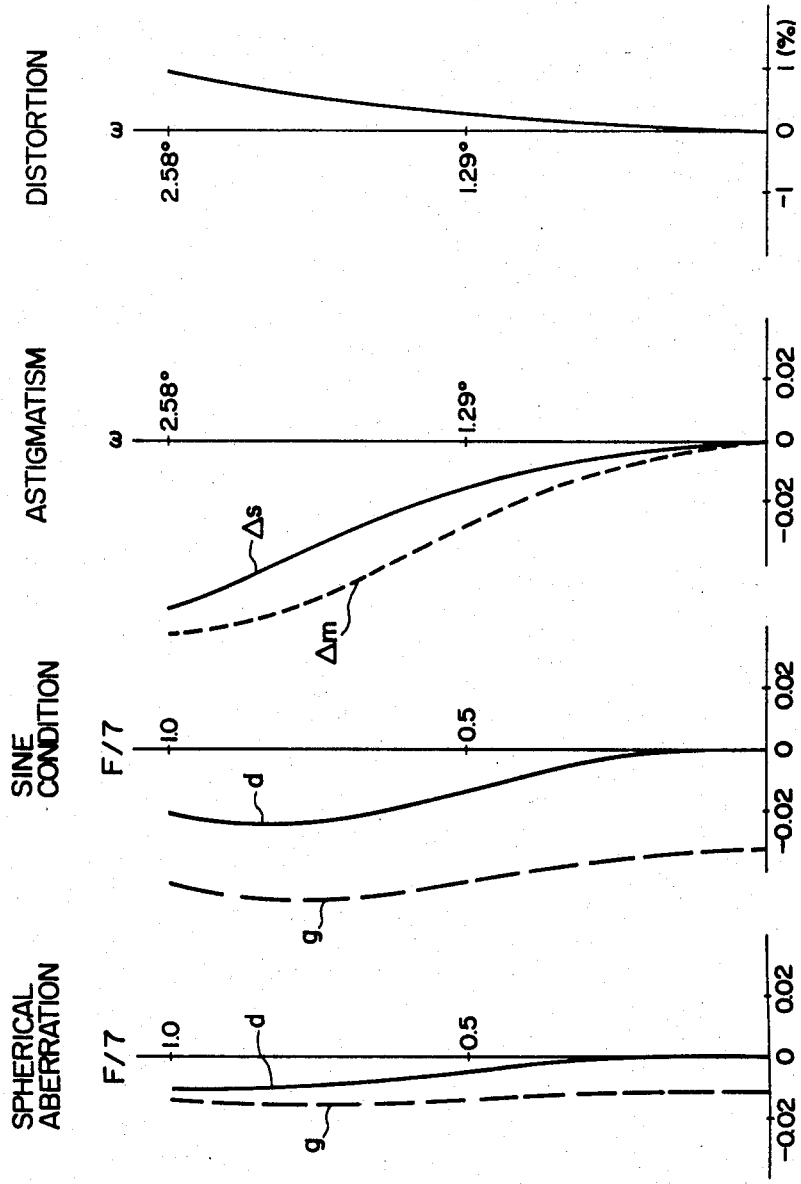
FIGS. 3 through 6 respectively show graphs illustrating aberration curves of Embodiments 1 through 4 of the present invention.
Figure 4:
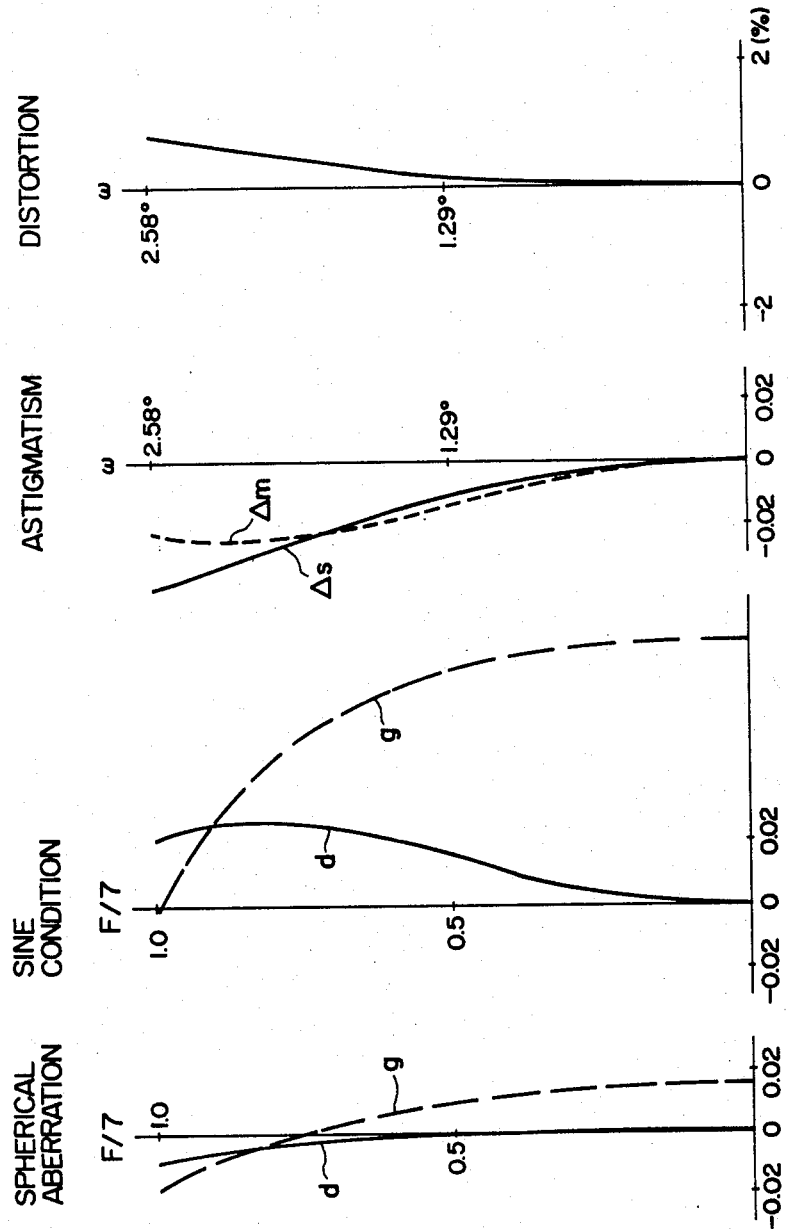
Figure 5:
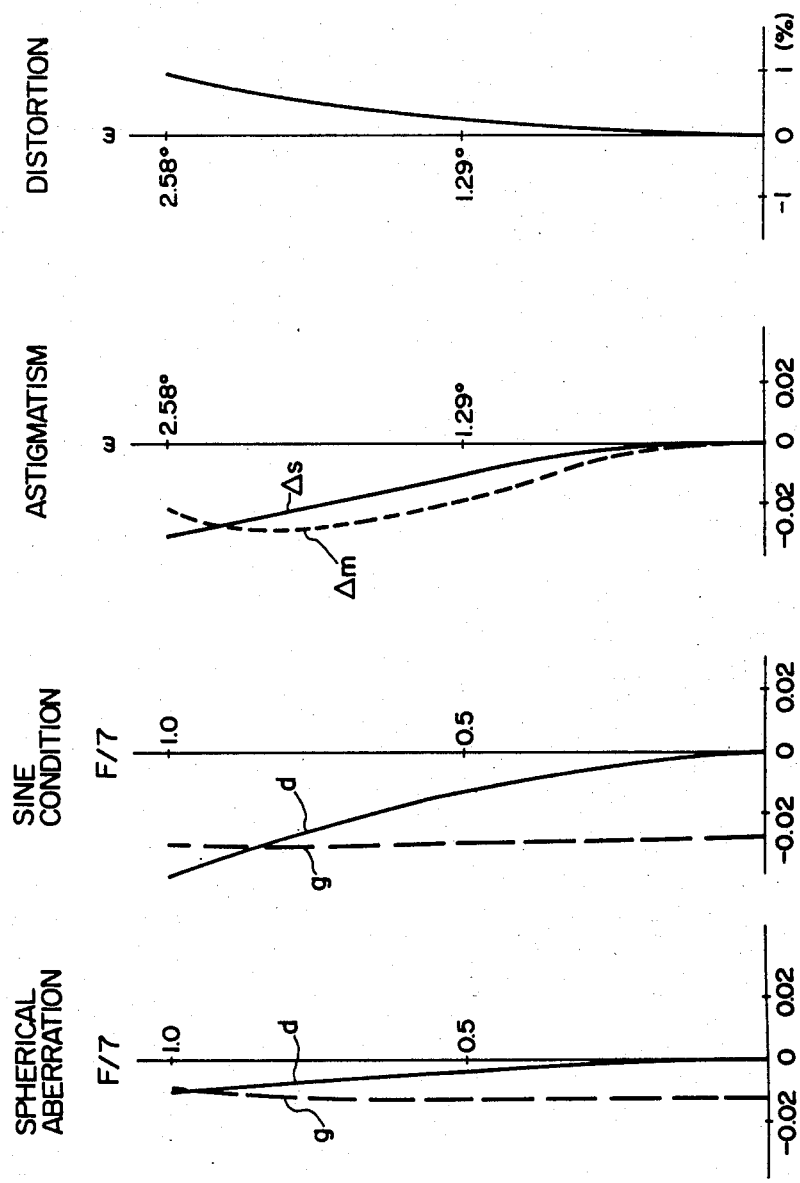
Figure 6:
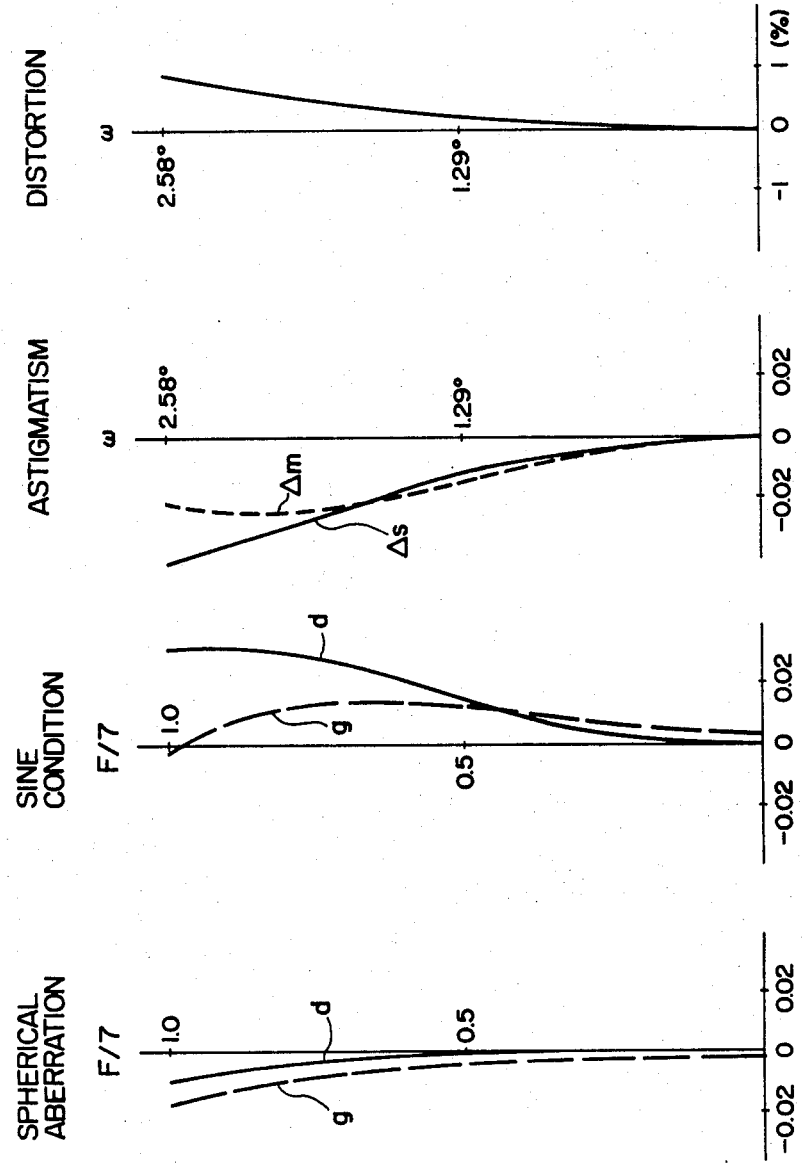

States of aberrations of the above-mentioned embodiments are shown in FIGS. 3 through 10. For respective embodiments, states of spherical aberration caused when the lens system is focused on an object at a short distance by advancing the front lens are shown in FIGS. 7, 8, 9 and 10. Out of these figures, FIG. 7 shows spherical aberration of Embodiment 1 when the advancing stroke of the front lens is 0.8715 and the focal length of the lens system at that time is 70.05, FIG. 8 shows spherical aberration of Embodiment 2 when the advancing stroke of the front lens is 0.9258 and the focal length of the lens system at that time is 69.90, FIG. 9 shows spherical aberration of Embodiment 3 when the advancing stroke of the front lens is 0.8539 and the focal length of the lens system at that time is 70.24, and FIG. 10 shows spherical aberration of Embodiment 4 when the advancing stroke of the front lens is 0.8978 and the focal length of the lens system at that time is 69.87. In all of FIGS. 7, 8, 9 and 10, aberration values are normalized to f=100.

Spherical aberration of the lens system according to the present invention to be caused when it is focused on an object at a short distance is reduced to about ½ compared with the cata-dioptric type telephoto lens system according to Japanese published unexamined patent application No. 131835/78. Compared with the cata-dioptric type telephoto lens system according to Japanese published examined patent application No. 1909/72, aberrations of the lens system according to the present invention are corrected to about the same degree as this known lens system, but the lens system as a whole is arranged to be remarkably compact compared with this known lens system. So, it is evident that the lens system according to the present invention enables to fully attain the object of the present invention to provide "a cata-dioptric type telephoto lens system which is arranged compactly and aberrations of which are corrected favourably."

I claim:

1. A cata-dioptric type telephoto lens system comprising a first, second, third, fourth and fifth lens system in the order according to the advancing direction of rays, said first lens being a positive meniscus lens arranged convex toward the object side, said second lens being a negative meniscus lens arranged convex toward the image side and having a reflecting surface formed on the convex surface thereof by leaving a transparent central portion, said third lens being a biconvex lens cemented to the surface on the image side of said first lens, said fourth lens being a biconcave lens cemented to the surface on the object side of said first lens and having a reflecting surface formed on the surface on the object side thereof, said fifth lens being a negative meniscus lens cemented to the surface on the object side of said second lens, said cata-dioptric type telephoto lens system satisfying the following conditions:

$$0.45f < r_1 < 0.75f \quad (1)$$

$$0.29f < f_{12} < 0.33f \quad (2)$$

$$0.03f < d_8 + d_3 < 0.05f \quad (3)$$

$$n_3 > 1.73 \quad (4)$$

$$n_4 < 1.58 \quad (5)$$

wherein reference symbol f represents the focal length of the lens system as a whole, reference symbol $f_{12}$ represents the total focal length of the first and second lenses, reference symbol $r_1$ represents the radius of curvature of the surface on the object side of the first lens, reference symbols $d_3$ and $d_8$ respectively represent thicknesses of the second and fifth lenses, and reference symbols $n_3$ and $n_4$ respectively represent refractive indices of the third and fourth lenses.

2. A cata-dioptric type telephoto lens system according to claim 1 further satisfying the following conditions:

$$0.13f < d_2 < 0.15f \tag{6}$$

$$n_2 < 1.6 \tag{7}$$

$$n_5 < 1.67 \tag{8}$$

$$\nu_5 < 50 \tag{9}$$

$$0.3f < f_3 < 0.4f \tag{10}$$

$$0.18f < |f_4| < 0.25f \tag{11}$$

$$0.18f < f_{25} < 0.24f \tag{12}$$

wherein reference symbol $d_2$ represents the distance between the first and second lenses, reference symbols $n_2$ and $n_5$ respectively represent refractive indices of the second and fifth lenses, reference symbol $\nu_5$ represents Abbe's number of the fifth lens, reference symbol $f_3$ represents the focal length of the third lens, reference symbol $f_4$ represents the total focal length of the system into which the rays enter through the surface on the image side of the third lens, pass through the third and first lenses, enter the fourth lens, are reflected by the surface on the object side of the fourth lens, pass through the fourth, first and third lenses again and go out of the system through the surface on the image side of the third lens, and reference symbol $f_{25}$ represents the total focal length of the fifth and second lenses.

3. A cata-dioptric type telephoto lens system according to claim 2, in which said cata-dioptric type telephoto lens system has the following numerical data:

| | | |
|---|---|---|
| $\Sigma P = 0.360$ | | |
| $r_1 = 49.733$ | | |
| $d_1 = 2.062$ | $n_1 = 1.58913$ | $\nu_1 = 61.11$ |
| $r_2 = 123.532$ | | |
| $d_2 = 13.694$ | | |
| $r_3 = -35.230$ | | |
| $d_3 = 1.861$ | $n_2 = 1.56732$ | $\nu_2 = 42.83$ |
| $r_4 = -52.023$ | | |
| $d_3 = -1.861$ | $n_2 = 1.56732$ | $\nu_2 = 42.83$ |
| $r_3 = -35.230$ | | |
| $d_4 = -12.658$ | | |
| $r_5 = -32.731$ | | |
| $d_5 = -1.036$ | $n_3 = 1.76200$ | $\nu_3 = 40.20$ |
| $r_2 = 123.532$ | | |
| $d_1 = -2.062$ | $n_1 = 1.58913$ | $\nu_1 = 61.11$ |
| $r_1 = 49.733$ | | |
| $d_6 = -0.622$ | $n_4 = 1.54771$ | $\nu_4 = 62.83$ |
| $r_6 = -28.196$ | | |
| $d_6 = 0.622$ | $n_4 = 1.54771$ | $\nu_4 = 62.83$ |
| $r_1 = 49.733$ | | |
| $d_1 = 2.062$ | $n_1 = 1.58913$ | $\nu_1 = 61.11$ |
| $r_2 = 123.532$ | | |
| $d_5 = 1.036$ | $n_3 = 1.76200$ | $\nu_3 = 40.20$ |
| $r_5 = -32.731$ | | |
| $d_7 = 9.964$ | | |
| $r_7 = -9.849$ | | |
| $d_8 = 2.694$ | $n_5 = 1.56444$ | $\nu_5 = 43.78$ |
| $r_3 = -35.230$ | | |
| $d_3 = 1.861$ | $n_2 = 1.56732$ | $\nu_2 = 42.83$ |
| $r_4 = -52.023$ | | |
| $f = 100.0$ $2\omega = 5.15°$ $F_{NO} = 7.0$ $T = 0.29$ | | |
| $f_1 = 139.9$, $f_{12} = 30.0$, $f_3 = 34.1$, $f_4 = -20.1$, $f_4 = -32.8$ | | |
| $f_{25} = -22.4$, $S = 0.8715$, $f_M = 70.05$ | | | wherein reference symbols $r_1, r_2, \ldots$ respectively represent radii of curvature of respective lens surfaces given in the order according to the advancing direction of rays, reference symbols $d_1, d_2, \ldots$ respectively represent distances between respective lens surfaces given in the order according to the advancing direction of rays, reference symbols $n_1, n_2, \ldots$ respectively represent refractive indices of respective lenses, reference symbols $\nu_1, \nu_2, \ldots$ respectively represent Abbe's numbers of respective lenses, reference symbol $\Sigma P$ represents Petzval's sum, reference symbol $T$ represents the telephoto ratio, reference symbol $S$ represents the maximum advancing stroke of the front lens, and reference symbol $f_M$ represents the focal length of the lens system as a whole when the front lens is fully advanced.

4. A cata-dioptric type telephoto lens system according to claim 2, in which said cata-dioptric type telephoto lens system has the following numerical data:

| | | |
|---|---|---|
| $\Sigma P = 0.400$ | | |
| $r_1 = 68.382$ | | |
| $d_1 = 2.062$ | $n_1 = 1.58913$ | $\nu_1 = 61.11$ |
| $r_2 = 292.413$ | | |
| $d_2 = 14.165$ | | |
| $r_3 = -33.647$ | | |
| $d_3 = 1.861$ | $n_2 = 1.56732$ | $\nu_2 = 42.83$ |
| $r_4 = -52.051$ | | |
| $d_3 = -1.861$ | $n_2 = 1.56732$ | $\nu_2 = 42.83$ |
| $r_3 = -33.647$ | | |
| $d_4 = -13.128$ | | |
| $r_5 = -33.372$ | | |
| $d_5 = -1.036$ | $n_3 = 1.83400$ | $\nu_3 = 37.19$ |
| $r_2 = 292.413$ | | |
| $d_1 = -2.062$ | $n_1 = 1.58913$ | $\nu_1 = 61.11$ |
| $r_1 = 68.382$ | | |
| $d_6 = -0.622$ | $n_4 = 1.46450$ | $\nu_4 = 65.94$ |
| $r_6 = -28.161$ | | |
| $d_6 = 0.622$ | $n_4 = 1.46450$ | $\nu_4 = 65.94$ |
| $r_1 = 68.382$ | | |
| $d_1 = 2.062$ | $n_1 = 1.58913$ | $\nu_1 = 61.11$ |
| $r_2 = 292.413$ | | |
| $d_5 = 1.036$ | $n_3 = 1.83400$ | $\nu_3 = 37.19$ |
| $r_5 = -33.372$ | | |
| $d_7 = 10.434$ | | |
| $r_7 = -9.854$ | | |
| $d_8 = 2.694$ | $n_5 = 1.64769$ | $\nu_5 = 33.80$ |
| $r_3 = -33.647$ | | |
| $d_3 = 1.861$ | $n_2 = 1.56732$ | $\nu_2 = 42.83$ |
| $r_4 = -52.051$ | | |
| $f = 100.0$, $2\omega = 5.15°$, $F_{NO} = 7.0$, $T = 0.297$ | | |
| $f_1 = 151.0$, $f_{12} = 31.5$, $f_3 = 36.0$, $f_4 = -24.9$, $f_4 = -42.9$ | | |
| $f_{25} = -19.9$, $S = 0.9258$, $f_M = 69.90$ | | | wherein reference symbols $r_1, r_2, \ldots$ respectively represent radii of curvature of respective lens surfaces given in the order according to the advancing direction of rays, reference symbols $d_1, d_2, \ldots$ respectively represent distances between respective lens surfaces given in the order according to the advancing direction of rays, reference symbols $n_1, n_2, \ldots$ respectively represent refractive indices of respective lenses, reference symbols $\nu_1, \nu_2, \ldots$ respectively represent Abbe's numbers of respective lenses, reference symbol $\Sigma P$ represents Petzval's sum, reference symbol $T$ represents the telephoto ratio, reference symbol $S$ represents the maximum advancing stroke of the front lens, and reference symbol $f_M$ represents the focal length of the lens system as a whole when the front lens is fully advanced.

5. A cata-dioptric type telephoto lens system according to claim 2, in which said cata-dioptric type telephoto lens system has the following numerical data:

$\Sigma P = 0.190$

| | | |
|---|---|---|
| $r_1 = 49.830$ | | |
| $d_1 = 2.062$ | $n_1 = 1.58913$ | $\nu_1 = 61.11$ |
| $r_2 = 135.120$ | | |
| $d_2 = 13.555$ | | |
| $r_3 = -35.495$ | | |
| $d_3 = 1.861$ | $n_2 = 1.56732$ | $\nu_2 = 42.83$ |
| $r_4 = -52.286$ | | |
| $d_3 = -1.861$ | $n_2 = 1.56732$ | $\nu_2 = 42.83$ |
| $r_3 = -35.495$ | | |
| $d_4 = -12.520$ | | |
| $r_5 = -39.896$ | | |
| $d_5 = -1.036$ | $n_3 = 1.80610$ | $\nu_3 = 40.95$ |
| $r_2 = 135.120$ | | |
| $d_1 = -2.062$ | $n_1 = 1.58913$ | $\nu_1 = 61.11$ |
| $r_1 = 49.830$ | | |
| $d_6 = -0.622$ | $n_4 = 1.49831$ | $\nu_4 = 65.03$ |
| $r_6 = -28.370$ | | |
| $d_6 = -0.622$ | $n_4 = 1.49831$ | $\nu_4 = 65.03$ |
| $r_1 = 49.830$ | | |
| $d_1 = 2.062$ | $n_1 = 1.58913$ | $\nu_1 = 61.11$ |
| $r_2 = 135.120$ | | |
| $d_5 = 1.036$ | $n_3 = 1.80610$ | $\nu_3 = 40.95$ |
| $r_5 = -39.896$ | | |
| $d_7 = 9.825$ | | |
| $r_7 = -9.490$ | | |
| $d_8 = 2.694$ | $n_5 = 1.53172$ | $\nu_5 = 48.90$ |
| $r_3 = -35.495$ | | |
| $d_3 = 1.861$ | $n_2 = 1.56732$ | $\nu_2 = 42.83$ |
| $r_4 = -52.286$ | | |

$f = 100.0, 2\omega = 5.15°, F_{NO} = 7.0, T = 0.289$
$f_1 = 132.8, f_{12} = 29.9, f_3 = 38.3, f_A = -19.7, f_4 = -36.2$
$f_{25} = -22.5, S = 0.8539, f_M = 70.24$ wherein reference symbols $r_1, r_2, \ldots$ respectively represent radii of curvature of respective lens surfaces given in the order according to the advancing direction of rays, reference symbols $d_1, d_2, \ldots$ respectively represent distances between respective lens surfaces given in the order according to the advancing direction of rays, reference symbols $n_1, n_2, \ldots$ respectively represent refractive indices of respective lenses, reference symbols $\nu_1, \nu_2, \ldots$ respectively represent Abbe's numbers of respective lenses, reference symbol $\Sigma P$ represents Petzval's sum, reference symbol T represents the telephoto ratio, reference symbol S represents the maximum advancing stroke of the front lens, and reference symbol $f_M$ represents the focal length of the lens system as a whole when the front lens is fully advanced.

6. A cata-dioptric type telephoto lens system according to claim 2, in which said cata-dioptric type telephoto lens system has the following numerical data:

$\Sigma P = 0.400$

| | | |
|---|---|---|
| $r_1 = 60.090$ | | |
| $d_1 = 2.062$ | $n_1 = 1.58913$ | $\nu_1 = 61.11$ |
| $r_2 = 221.654$ | | |
| $d_2 = 13.816$ | | |
| $r_3 = -34.214$ | | |
| $d_3 = 1.861$ | $n_2 = 1.56732$ | $\nu_2 = 42.83$ |
| $r_4 = -52.256$ | | |
| $d_3 = -1.861$ | $n_2 = 1.56732$ | $\nu_2 = 42.83$ |
| $r_3 = -34.214$ | | |
| $d_4 = -12.780$ | | |
| $r_5 = -33.981$ | | |
| $d_5 = -1.036$ | $n_3 = 1.80440$ | $\nu_3 = 39.62$ |
| $r_2 = 221.654$ | | |
| $d_1 = -2.062$ | $n_1 = 1.58913$ | $\nu_1 = 61.11$ |
| $r_1 = 60.090$ | | |
| $d_6 = -0.622$ | $n_4 = 1.46450$ | $\nu_4 = 65.94$ |
| $r_6 = -27.957$ | | |
| $d_6 = 0.622$ | $n_4 = 1.46450$ | $\nu_4 = 65.94$ |
| $r_1 = 60.090$ | | |
| $d_1 = 2.062$ | $n_1 = 1.58913$ | $\nu_1 = 61.11$ |
| $r_2 = 221.654$ | | |
| $d_5 = 1.036$ | $n_3 = 1.80440$ | $\nu_3 = 39.62$ |
| $r_5 = -33.981$ | | |
| $d_7 = 10.086$ | | |
| $r_7 = -9.294$ | | |
| $d_8 = 2.694$ | $n_5 = 1.58144$ | $\nu_5 = 40.75$ |
| $r_3 = -34.214$ | | |
| $d_3 = 1.861$ | $n_2 = 1.56732$ | $\nu_2 = 42.83$ |
| $r_4 = -52.256$ | | |

$f = 100.0, 2\omega = 5.15°, F_{NO} = 7.0, T = 0.293$
$f_1 = 139.3, f_{12} = 31.0, f_3 = 36.7, f_A = -23.3, f_4 = -41.0$
$f_{25} = -20.3, S = 0.8978, f_M = 69.87$ wherein reference symbols $r_1, r_2, \ldots$ respectively represent radii of curvature of respective lens surfaces given in the order according to the advancing direction of rays, reference symbols $d_1, d_2, \ldots$ respectively represent distances between respective lens surfaces given in the order according to the advancing direction of rays, reference symbols $n_1, n_2, \ldots$ respectively represent refractive indices of respective lenses, reference symbols $\nu_1, \nu_2, \ldots$ respectively represent Abbe's numbers of respective lenses, reference symbol $\Sigma P$ represents Petzval's sum, reference symbol T represents the telephoto ratio, reference symbol S represents the maximum advancing stroke of the front lens, and reference symbol $f_M$ represents the focal length of the lens system as a whole when the front lens is fully advanced.

* * * * *